(12) United States Patent
Luk-Paszyc et al.

(10) Patent No.: US 8,604,966 B1
(45) Date of Patent: Dec. 10, 2013

(54) CORRECTION OF RADAR BEAM REFRACTION USING ELECTRO-OPTICAL MEASUREMENTS

(75) Inventors: Jerzy W. Luk-Paszyc, Vorhees, NJ (US); Jonathan A. Boardman, Mt. Laurel, NJ (US)

(73) Assignee: Lockheed Martin Corporation, Bethesda, MD (US)

(*) Notice: Subject to any disclaimer, the term of this patent is extended or adjusted under 35 U.S.C. 154(b) by 168 days.

(21) Appl. No.: 13/180,397

(22) Filed: Jul. 11, 2011

(51) Int. Cl.
*G01S 13/00* (2006.01)

(52) U.S. Cl.
USPC .... 342/52; 342/165; 342/357.44; 342/357.65

(58) Field of Classification Search
USPC .................. 342/52, 118, 140, 165, 174, 350, 342/357.44, 357.65
See application file for complete search history.

(56) References Cited

U.S. PATENT DOCUMENTS

| | | | | |
|---|---|---|---|---|
| 4,823,134 | A * | 4/1989 | James et al. | 342/359 |
| 5,852,792 | A * | 12/1998 | Nielson | 701/518 |
| 6,853,331 | B1 * | 2/2005 | Belen'kii et al. | 342/159 |
| 7,265,820 | B1 * | 9/2007 | Gordley | 356/3.01 |
| 7,451,022 | B1 * | 11/2008 | Luk-Paszyc et al. | 701/13 |
| 2003/0197930 | A1 * | 10/2003 | Baun et al. | 359/430 |
| 2007/0027624 | A1 * | 2/2007 | Powe et al. | 701/213 |
| 2007/0038374 | A1 * | 2/2007 | Belenkii et al. | 701/222 |
| 2009/0153396 | A1 * | 6/2009 | Ainsworth et al. | 342/357.12 |
| 2009/0177398 | A1 * | 7/2009 | Belenkii et al. | 701/220 |

OTHER PUBLICATIONS

Gerard Kunz ; Eric Heemskerk ; Lex van Eijk; Comparison of atmospheric refraction at radar and optical wavelengths. Proc. SPIE 5981, Optics in Atmospheric Propagation and Adaptive Systems VIII, 59810B (Oct. 13, 2005); doi:10.1117/12.638613.*

* cited by examiner

*Primary Examiner* — John B Sotomayor
*Assistant Examiner* — Marcus Windrich
(74) *Attorney, Agent, or Firm* — Howard IP Law Group, PC

(57) ABSTRACT

A method determines the atmospheric refraction of a radar beam by utilizing a stabilized optical telescope directed toward a star near the radar target location. This allows measuring the target refraction as observed from ships at sea without a-priori knowledge of the local refraction index or weather conditions in the target area. The telescope may employ an infra-red (IR) sensor and is capable of imaging stars. The atmospheric refraction of the star light is determined by pointing the telescope based on star ephemeris data, and measuring the star image deviation from the center of the telescope's field-of-view (FOV). The corresponding refraction of the radar beam can be determined by employing a conversion factor relating the IR-to-RF atmospheric propagation characteristics. This conversion factor can be obtained by dedicated tracking measurements.

10 Claims, 4 Drawing Sheets

Determination of Atmospheric RF Refraction by Electro-Optical Method

CORRECTION OF RADAR BEAM REFRACTION USING ELECTRO-OPTICAL MEASUREMENTS

STATEMENT OF GOVERNMENT INTEREST

This invention was made with Government support under Contract N00024-03-C-6110 awarded by the Department of the Navy. The Government has certain rights in this invention.

BACKGROUND

Radar is used for detection and tracking of distant objects. In some cases it is important to know the location of a target with great accuracy, as might be the case when tracking a hostile incoming missile (a "target" in radar parlance). Under such conditions, various factors can adversely affect the radar-indicated location of the target. Among these factors are refraction of radio-frequency (RF) electromagnetic radiation by the atmosphere through which the electromagnetic signals propagate.

Traditional methods of determining atmospheric refraction include the use of a refractive index. This index can be determined based on the radar location and atmospheric conditions, and is usually available in a table. However, atmospheric conditions can change frequently, and up-to-date information may not always be available. Improved, real-time methods for determining atmospheric refraction are desired. Once the refraction is deemed to be known, the radar-indicated location of the target can be corrected for the refraction.

Improved or alternative methods are desired for determining the effects of refraction on a radar RF beam.

SUMMARY

A method according to an aspect of the disclosure is for determining radio-frequency (RF) beam refraction in the direction of a target. The method comprises the step of determining the location of a radio-frequency target. Ephemeris information relating to a star near the expected location is obtained. An optical telescope is pointed toward the star using the ephemeris data. The deviation of the star from the boresight of the optical telescope is deemed to be an indication of the optical refraction in the direction of the location. The indicated optical refraction is converted into radio-frequency refraction.

A method according to an aspect of the disclosure is for determining radio-frequency beam refraction in the direction of a target. The method comprises the step of pre-calibrating the pointing of an optical or infrared telescope. The expected location of a radio-frequency target is determined, and ephemeris information relating to a star near the expected target location is obtained. The optical telescope is pointed toward the star near the expected target location using the ephemeris data. The image of the star is observed in the field-of-view of the optical telescope. The deviation of the star from the boresight of the optical telescope is noted, and deemed to be an indication of the optical refraction in the direction of the expected target location. The indicated optical refraction is converted into radio-frequency refraction. The conversion may be based on predetermined conversion factors.

A method according to another aspect of the disclosure is for correcting for radio-frequency refraction of a radar beam. The method comprises the steps of determining the expected location of a radio-frequency target, and obtaining ephemeris information relating to a star near the expected target location. Using the ephemeris information, an optical or infrared telescope is pointed toward the star near the expected target location. The deviation of the image of the star from the boresight of the infrared telescope is noted as an indication of the infrared refraction in the direction of the expected target location. The indicated infrared refraction is converted into radio-frequency refraction, and the indicated radar-derived location of, the target is corrected by the radio-frequency refraction.

DETAILED DESCRIPTION

Figure 1:
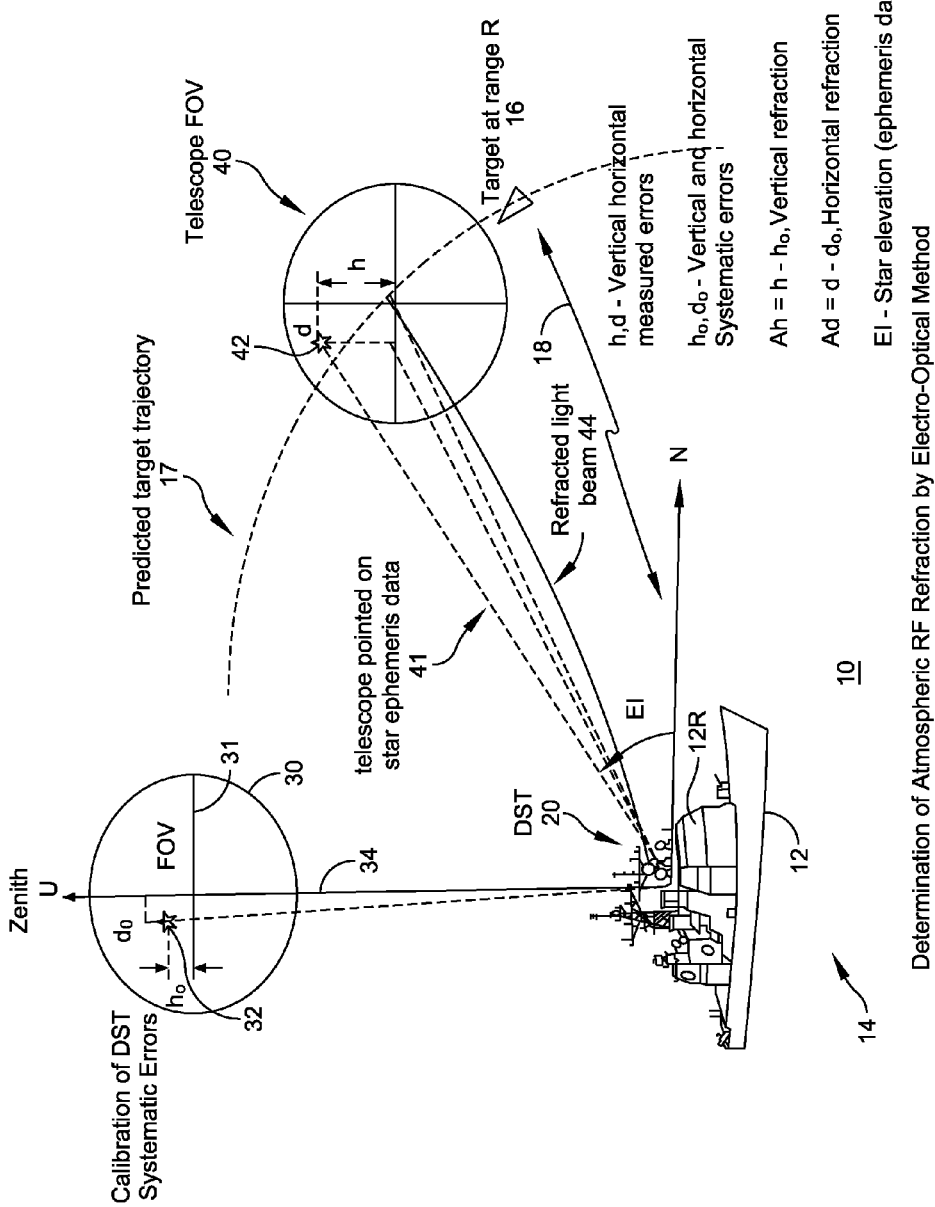
FIG. 1 is a simplified scenario illustrating a ship fitted with a radar system and an infrared telescope, in the process of determining the location of a distant target in the presence of refraction.

FIG. 1 illustrates a scenario 10 in which a ship 12 at sea 14 uses an on-board radar 12R to measure characteristics of an airborne target 16 at a range R, following a trajectory designated 17. The electromagnetic radio-frequency (RE) radar signal is illustrated as a "lightning bolt" symbol 18. As known, atmospheric refraction tends to bend beams of electromagnetic radiation. The amount of refraction of a beam of radio-frequency (RF) radiation, such as beam 18 of FIG. 1, depends upon moisture content of the atmosphere and possibly upon other factors, and is an integral function, meaning that the amount of moisture and other factors at a particular location is not determinative of the amount of refraction, but instead the refraction is dependent upon the cumulation of moisture and other factors along the entire length of path 18.

As illustrated in FIG. 1, ship 12 is fitted with a controllable or directionally controllable infrared (IR) telescope 20, designated Diurnal Star Tracker (DST). The DST is used inter alia for ship navigation, but the salient aspect of the DST 20 for purposes of the disclosure is the controllable infrared viewer or camera having a field of view (FOV). The camera aspect of the infrared telescope allows angle measurements to be automated, but the principles of the disclosure may be achieved with manual observations. The infrared telescope is mounted for azimuth (AZ) and elevation (EL) motion, and can be automatically pointed and maintain the pointing in the face of, or in spite of, ship motion.

In FIG. 1, the field of view (FOV) of telescope 20 is illustrated as 30 for the case in which the telescope line-of-sight axis 34 is directed toward the zenith. This is the orientation which is used to calibrate the DST telescope against systemic or systematic errors. As illustrated, a star 32 is illustrated as being found in the FOV 30 at a location spaced away from the line-of-sight intercept 31. The spacing of the star 32 from the FOV intercept point is by an azimuth amount $d_0$ and an elevation amount $h_0$. If the pointing of the telescope follows the commanded pointing direction, the location of a star with known ephemeredes should be at a given location in the FOV 30. Any deviation from the expected location in the FOV can be considered to be a systemic error, which can be compensated for.

Also in FIG. 1, a field-of-view (FOV) 40 of the telescope 20 is centered about a telescope line-of-sight 41 which is directed toward the location, as established by ephemeris data, of a known star 42 which is close to the expected location of the RF target. With line-of-sight 41, in theory the FOV 40 should image the star 42 at its center. It must be understood that the light beam will be refracted, so there is no actual "straight line" extending from DST telescope 20 to the star 42. The curved or refracted light ray is designated 44. The actual star 42 location in FOV 40 is spaced away from the center of the FOV by an amount which is designated h in elevation and d in azimuth. This deviation represents the optical or infrared refraction immediately adjacent the anticipated location of the RF target 16. In FIG. 1, h and d are the measured vertical and horizontal errors, h0 and d0 are the vertical and horizontal systematic errors, $\Delta h = h - h_0$ and $\Delta d = d - d_0$ are the vertical and horizontal optical or infrared refraction, respectively.

Figure 2:
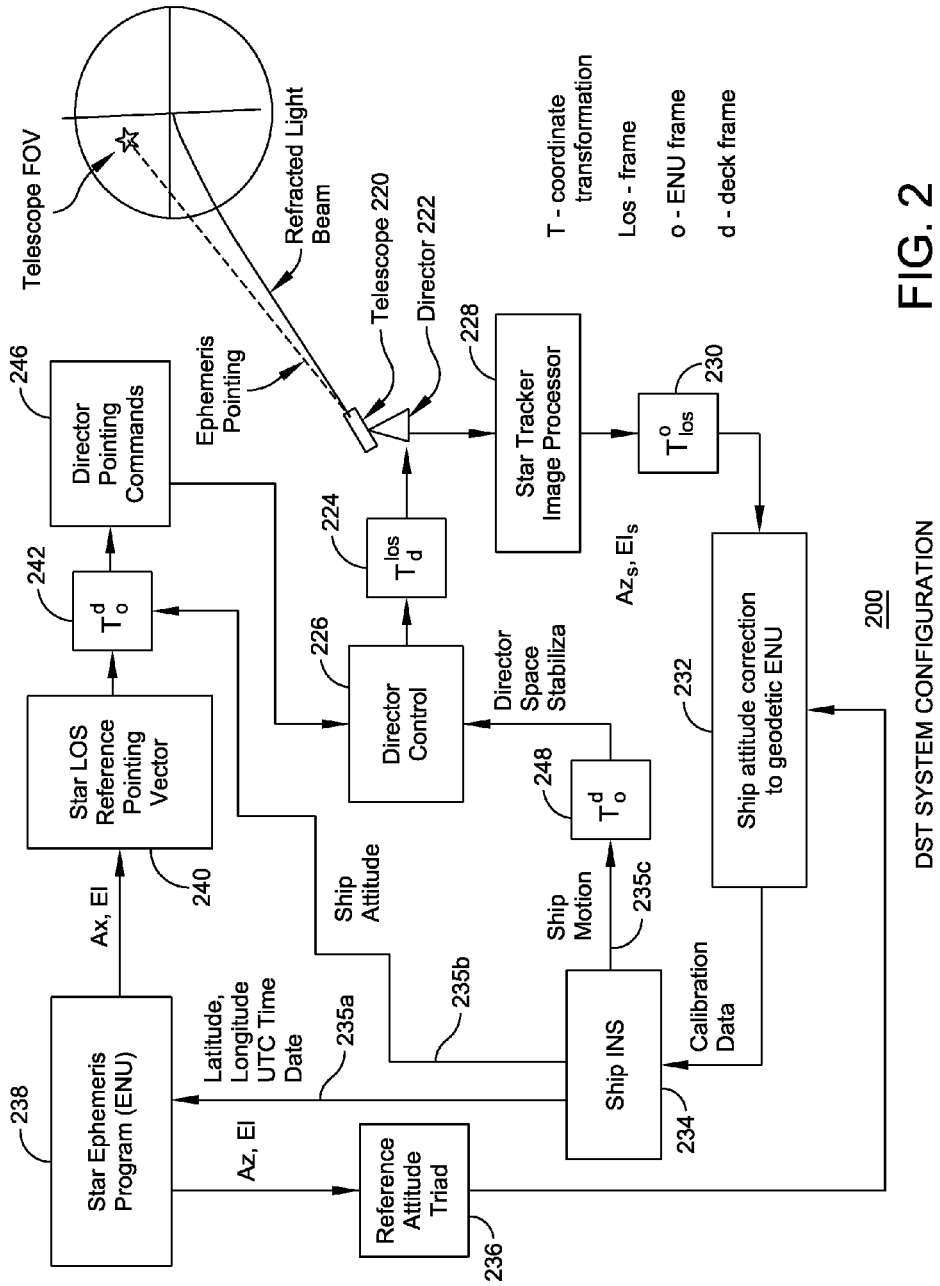
FIG. 2 is a simplified diagram illustrating the system flow of the DST (Diurnal Star Tracker) used for taking the star measurements.

FIG. 2 is a simplified diagram 200 in block and schematic form, illustrating some details of the Diurnal Star Tracker (DST) 20 of FIG. 1. In FIG. 2, the actual optical or infrared telescope is designated 220. Telescope 220 is mounted on a controllably movable platform or director 222, the direction of which is controlled by pointing direction control signals generated by a coordinate transformation from deck frame to line-of-sight frame ($T_d^{LOS}$) function illustrated as a block 224. Block 224 receives composite pointing direction commands from a director control block 226. A star tracker image processor, illustrated as a block 228, processes the telescope image information to produce star azimuth ($Az_s$) and star elevation ($El_s$) which are the DST measurements of the reference star being measured. The processed information from block 228 is applied to a block 230 representing coordinate transformation from ENU frame to line-of-sight frame ($T_{LOS}^o$). Block 230 produces ship attitude correction in local coordinates, which are applied to a block 232. Block 232, using reference attitude triad information from a block 236, converts the ship attitude correction calibration data in local coordinates to ship attitude correction in geodetic East North Up (ENU) coordinates. The ship attitude correction in ENU coordinates is applied to block 234, which represents the ship Inertial Navigation System (INS). The INS 234 responds to ship motion by generating latitude, longitude, Universal Time Code (UTC) time and date, which are applied by a path 235a to a star ephemeris program illustrated as a block 238. INS 234 also produces ship attitude information on a path 235b for application to a block 242, representing coordinate conversion from ENU frame to deck frame ($T_o^d$), and ship roll, pitch and heading motion on a path 235c for application to a block 248. Block 248 represents coordinate conversion from deck frame to ENU frame ($T_o^d$). The star ephemeris program 238 produces Az and El, which are the reference azimuth and elevation angles, respectively, of the star to be measured. The Az and El from block 238 are applied to block 236, as well as to block 240. Block 240 processes the Az and El to produce a star line-of-sight (LOS) pointing vector in the ENU frame for application to block 242. Block 242 transforms the star line-of-sight pointing vector to the ship deck frame to produce an input signal for application to a director pointing command generator block 246. Director control block 226 receives the pointing direction commands from block 246 and ship motion stabilization signals from block 248 to generate a composite director pointing command signal for pointing the telescope in toward the selected star. The net effect of the Diurnal Star Tracker 200 of FIG. 2 is to generate navigational signals for the ship 12 of FIG. 1 and to stabilize the pointing of the optical telescope 220.

According to an aspect of the disclosure, a stabilized, controllable infrared or other optical telescope is pointed at the coordinates of a star located near the radar target as seen from the radar system. The stabilized telescope may be associated with a diurnal star tracker, or may be independent. The deviation of the star from the boresight of the telescope is determined. In a DST arrangement such as that of FIG. 2, this is readily accomplished by noting the azimuth and elevation deviation of the star from the center of the field of view. This deviation is deemed to represent the optical refraction. The optical refraction is converted to radio-frequency (RF) refraction to thereby establish the RF refraction. The RE refraction is used to correct the location of the target as indicated by the radar.

Figure 3:
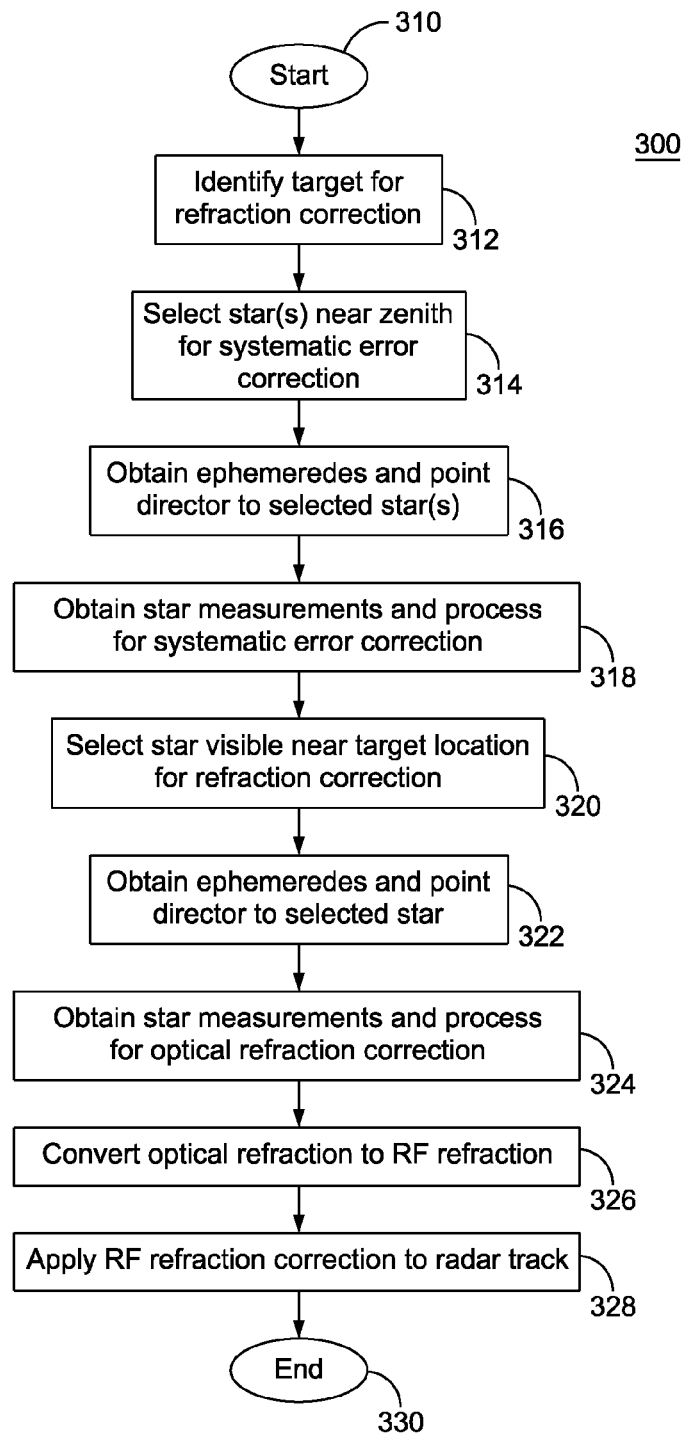
FIG. 3 is flow diagram illustrating steps according to some aspects of the disclosure.

FIG. 3, is a simplified logic flow chart or diagram illustrating some steps according to aspects of the disclosure. In FIG. 3, the logic 300 starts at a START block 310, and flows to a block 312. Block 312 represents identification of the target in radar track, the location of which is to be corrected for refraction. This identification can be by means of its location. The logic then flows to Block 314, which is selection of a star or stars near zenith to be used for systematic error correction. Stars are typically selected based on preferred locations and brightness. Next, the logic flows to Block 316, where the ephemerides of the star are obtained, and the director (222 of FIG. 2) is pointed towards the star(s). From Block 316, the logic flows to block 318, which represents the measurement of the star(s) relative to boresight, and processing to correct for the systematic errors. From Block 318, the logic flows to Block 320, which is the selection of a star visible near the target location (as seen from the radar or the telescope) for refraction correction. From Block 320, the logic flows to Block 322, which represents obtaining the ephemeredes for the selected star and pointing the DST director toward the selected star. From Block 322, the logic flows to Block 324, where the measurements of the selected star are obtained and processed for optical refraction correction. From Block 324, the logic flows to a block 326, which represents the conversion of optical refraction to RF refraction. This can be accomplished with the use of predetermined or precalculated optical-to-RF-refraction data. This data can be obtained by taking apparent [position] measurements of an object with a known location, such as a test aircraft, with both RF and IR sensors, at various elevation angles and target ranges. The actual location of the test aircraft can be determined by GPS onboard the test aircraft. The atmospheric refraction in each band can then be observed and the relationship derived. The results can then be stored in tables for the real-time system to access. Next, in Block 328, the RF refraction correction is applied to the target track in terms of a position correction. Finally, the logic ends at Block 330.

Figure 4:
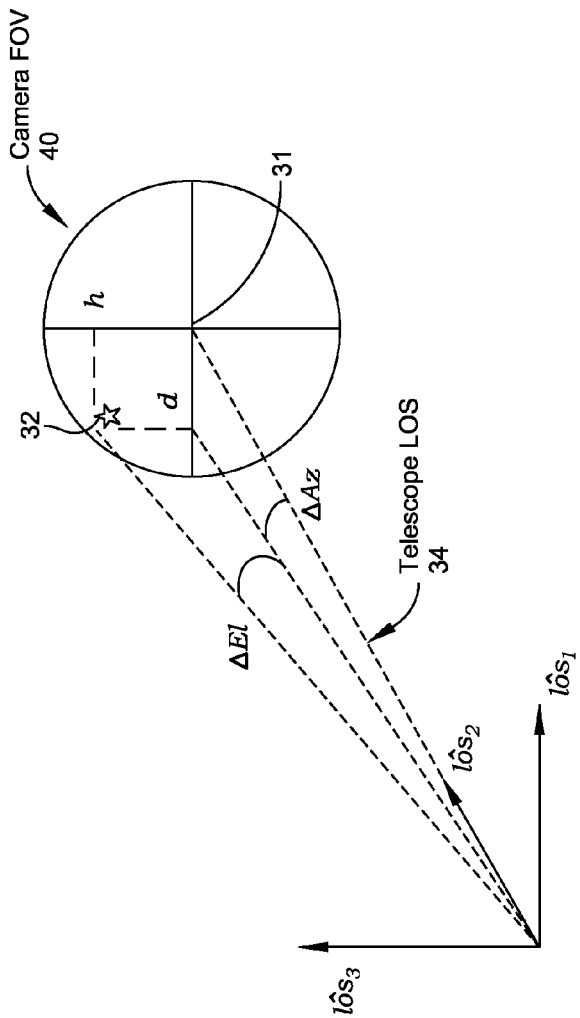
FIG. 4 is a diagram illustrating geometry and processing for determining the star angle relative to telescope line-of-sight, and some related equations.

FIG. 4 includes a telescope or camera field of view (FOV) 40 showing the line-of-sight line 34 and the line-of-sight intercept 31 with the FOV. The location of a star 32 relative to the intercept 31 is illustrated, with its horizontal displacement d and vertical displacement h. The corresponding included angles $\Delta El$ and $\Delta Az$ are also shown. The azimuth angular displacement is given by $\Delta Az = \text{Tan}^{-1}(d/f)$ and the horizontal displacement by $\Delta El = \text{Tan}^{-1}((h/f)\cos(\Delta Az))$, where f is the focal length of the telescope lens.

A method according to an aspect of the disclosure is for determining radio-frequency (RF) antenna beam (18) refraction in the direction of a target (16). The method comprises the step (314, 316, 318) of pre-calibrating the pointing of an infrared telescope (20). The expected location of a radio-frequency (RF) target (16) is determined, and ephemeris information relating to a star (42) near the expected location is obtained (320, 322). The infrared telescope (20) is pointed toward the star (42) near the expected location by using the ephemeris data. The image of the star is observed in the field-of-view (40) of the infrared telescope (20). The deviation (d, h) of the star (42) from the boresight (34) of the infrared telescope (20) is noted, and deemed (324) to be an indication of the infrared refraction in the direction of the expected location of the target (16). The indicated infrared refraction is converted (326) into radio-frequency refraction. The resulting radio-frequency refraction is applied to correct the beam direction. In a particular mode of the method, the conversion of infrared refraction to RF refraction is performed with a predetermined conversion table. The predetermined conversion table may be made by the additional steps of observing a target at different angles of elevation and different ranges with both infrared and RF sensors, and tabulating the results.

A method according to another aspect of the disclosure is for correcting for radio-frequency (RF) refraction of a radar beam. The method comprises the steps of determining the expected location (332) of a radio-frequency target, and obtaining ephemeris information (320) relating to a star near the expected location. Using the ephemeris information, an infrared telescope (20, 220) is pointed (322) toward the star near the expected location. The deviation of the image of the star (d, h) from the boresight (31) of the infrared telescope (20, 220) is noted as an indication of the infrared refraction (324) in the direction of the expected location. The indicated infrared refraction is converted (326) into radio-frequency refraction, and the indicated radar location of the target is corrected (328) by the radio-frequency refraction. In a particular mode of the method, the telescope is corrected for systemic errors (324, 316, 318). The step of converting the infrared refraction into RF refraction in a particular mode of the method is accomplished by predetermining optical and RF refraction of a given object at a given elevation angle and range, and tabulating the data for use.

What is claimed is:

1. A method for determining radio-frequency beam refraction in the direction of a target, said method comprising the steps of:
   determining the location of a radio-frequency target;
   obtaining ephemeris information relating to a star near said location;
   using said ephemeris information, pointing an optical telescope toward said star;
   determining the deviation of said star from the boresight of said optical telescope as an indication of the optical refraction; and
   converting the indicated optical refraction into radio-frequency refraction.

2. A method according to claim 1, further comprising the initial step of pre-calibrating the telescope for systematic errors.

3. A method according to claim 1, wherein said optical telescope comprises an infrared telescope.

4. A method for determining radio-frequency beam refraction in the direction of a target, said method comprising the steps of:
   pre-calibrating the pointing of an optical telescope;
   determining the location of a radio-frequency target;
   obtaining ephemeris information relating to a star near said expected location;
   using said ephemeris information, pointing said optical telescope toward said star near said expected location;
   observing the image of said star in the field-of-view of said optical telescope, and noting the deviation of said star from the boresight as an indication of the optical refraction in the direction of said expected location; and
   converting the indicated optical refraction into radio-frequency refraction.

5. A method according to claim 4, wherein said step of converting includes the steps of:
   obtaining the conversion factor for the given range and elevation angle from a table.

6. A method according to claim 4, wherein said step of converting includes the preliminary steps of:
   determining the location of a test target;
   observing said test target with both optical and RF sensors;
   determining the optical refraction;
   determining the RF refraction; and
   tabulating a relationship of said optical and RF refraction.

7. A method according to claim 6, wherein said relationship is a ratio.

8. A method for correcting for radio-frequency refraction of a radar beam, said method comprising the steps of:
   determining the expected location of a radio-frequency target;
   obtaining ephemeris information relating to a star near said expected location;
   using said ephemeris information, pointing an infrared telescope toward said star near said expected location;
   noting the deviation of the image of said star from the boresight of said infrared telescope as an indication of the infrared refraction in the direction of said expected location;
   converting the indicated infrared refraction into radio-frequency refraction; and
   correcting the indicated radar location of said target by said radio-frequency refraction.

9. A method according to claim 8, further comprising the step of precorrecting the telescope for systemic errors.

10. A method according to claim 9, wherein said step of precorrecting further comprises the steps of:
    selecting a star near the zenith;
    obtaining ephemeredes for the selected star, and pointing said telescope toward the nominal position of said star as indicated by said ephemeredes;
    measuring the deviation of said star from the boresight and processing said deviation to determine telescope pointing error.

* * * * *